(12) United States Patent
Lee et al.

(10) Patent No.: US 8,761,114 B2
(45) Date of Patent: Jun. 24, 2014

(54) METHOD AND APPARATUS FOR TRANSMITTING/RECEIVING MULTIPLE CODEWORDS IN SC-FDMA SYSTEM

(71) Applicant: Electronic and Telecommunications Research Institute, Daejeon (KR)

(72) Inventors: Hee-Soo Lee, Daejeon (KR); Bang-Won Seo, Daejeon (KR); Hyun-Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/951,859

(22) Filed: Jul. 26, 2013

(65) Prior Publication Data

US 2013/0308657 A1 Nov. 21, 2013

Related U.S. Application Data

(63) Continuation of application No. 12/476,125, filed on Jun. 1, 2009, now Pat. No. 8,520,610, which is a continuation of application No. PCT/KR2007/006142, filed on Nov. 30, 2007.

(30) Foreign Application Priority Data

Dec. 1, 2006 (KR) .................. 10-2006-0120762
Jun. 13, 2007 (KR) .................. 10-2007-0057886

(51) Int. Cl.
*H04W 4/00* (2009.01)

(52) U.S. Cl.
USPC ........... 370/329; 370/331; 370/330; 370/345; 370/480; 375/260; 375/267

(58) Field of Classification Search
USPC .......... 370/277, 278, 276, 293, 296; 455/412, 455/168.1, 188.1, 418, 422.1, 432.1, 432.3, 455/434, 435.1–435.3, 436, 440, 444, 450, 455/452.1–452.2
See application file for complete search history.

(56) References Cited

U.S. PATENT DOCUMENTS 7,873,022 B2   1/2011   Hansen et al.
2002/0118765 A1   8/2002   Nangia et al.

(Continued)

FOREIGN PATENT DOCUMENTS

| EP | 1705823 | 9/2006 |
|---|---|---|
| KR | 1020060102185 | 9/2006 |
| KR | 1020070074431 | 7/2007 |
| KR | 1020070077022 | 7/2007 |
| WO | 2006/118411 A2 | 11/2006 |
| WO | 2007/092945 A2 | 8/2007 |

OTHER PUBLICATIONS

Myung, Hyung G. et al., "Single Carrier FDMA for Uplink Wireless Transmission," IEEE Vehicular Technology Magazine, vol. 1(3):30-38 (2006).

Ofuji, Yoshiaki et al., "Frequence Domain Channel-Dependent Scheduling Employing an Adaptive Transmission Bandwidth for Pilot Channel in Uplink Single-Carier-FDMA Radio Access," IEEE 63rd Vehicular Technology Conference (VTC), vol. 1:334-338 (2006).

*Primary Examiner* — Kibrom T Hailu
*Assistant Examiner* — Zewdu A Beyen
(74) *Attorney, Agent, or Firm* — Nelson Mullins Riley & Scarborough LLP

(57) ABSTRACT

The present invention relates a method and apparatus for transmitting/receiving data using multiple codewords in a communication system using SC-FDMA (single carrier frequency division multiple access). A transmitter generates the multiple codewords for user data and transmits the generated multiple codewords. A receiver receives the multiple codewords and sequentially performs decoding and SIC (successive interference cancellation) on the received multiple codewords. Therefore, this structure can minimize a PAPR (peak to average power ratio) and considerably reduces interference between symbols in a frequency selective fading environment.

20 Claims, 9 Drawing Sheets

(56) References Cited

U.S. PATENT DOCUMENTS

| | | |
|---|---|---|
| 2002/0154705 A1 | 10/2002 | Walton et al. |
| 2005/0254596 A1* | 11/2005 | Naguib .................. 375/299 |
| 2006/0118411 A1 | 6/2006 | Seefeldt et al. |
| 2006/0215541 A1 | 9/2006 | Kwun et al. |
| 2007/0041404 A1 | 2/2007 | Palanki et al. |
| 2007/0165104 A1 | 7/2007 | Khan et al. |
| 2007/0171889 A1 | 7/2007 | Kwon et al. |
| 2007/0211656 A1 | 9/2007 | Kwak et al. |
| 2008/0049709 A1 | 2/2008 | Pan et al. |
| 2008/0117999 A1 | 5/2008 | Kadous et al. |

* cited by examiner

FIG. 5

| DFT Index | | | | |
|---|---|---|---|---|
| 0 | $d_1(0)$ | $d_1(2)$ | $d_1(4)$ | |
| 1 | $d_1(1)$ | $d_1(3)$ | $d_1(5)$ | |
| 2 | $d_2(0)$ | $d_2(2)$ | $d_2(4)$ | |
| 3 | $d_2(1)$ | $d_2(3)$ | $d_2(5)$ | |
| | 0 | 1 | 2 | n |

(a)

| DFT Index | | | | |
|---|---|---|---|---|
| 0 | $d_1(0)$ | $d_1(2)$ | $d_1(4)$ | |
| 1 | $d_2(0)$ | $d_2(2)$ | $d_2(4)$ | |
| 2 | $d_1(1)$ | $d_1(3)$ | $d_1(5)$ | |
| 3 | $d_2(1)$ | $d_2(3)$ | $d_2(5)$ | |
| | 0 | 1 | 2 | n |

DFT Index

| | 0 | 1 | 2 | |
|---|---|---|---|---|
| 0 | $d_1(0)$ | $d_2(3)$ | $d_2(4)$ | |
| 1 | $d_1(1)$ | $d_1(2)$ | $d_2(5)$ | |
| 2 | $d_2(0)$ | $d_1(3)$ | $d_1(4)$ | |
| 3 | $d_2(1)$ | $d_2(2)$ | $d_1(5)$ | n |

(a)

DFT Index

| | 0 | 1 | 2 | |
|---|---|---|---|---|
| 0 | $d_1(0)$ | $d_2(3)$ | $d_1(5)$ | |
| 1 | $d_2(0)$ | $d_1(2)$ | $d_2(5)$ | |
| 2 | $d_1(1)$ | $d_2(2)$ | $d_1(4)$ | |
| 3 | $d_2(1)$ | $d_1(3)$ | $d_2(4)$ | n |

(b)

METHOD AND APPARATUS FOR TRANSMITTING/RECEIVING MULTIPLE CODEWORDS IN SC-FDMA SYSTEM

CROSS-REFERENCE TO RELATED APPLICATION

This application is a continuation of U.S. patent application Ser. No. 12/476,125, filed on Jun. 1, 2009, which is a continuation of PCT application No. PCT/KR2007/006142 filed Nov. 30, 2007, which claims priority to and the benefit of Korean Patent Application No. 10-2006-0120762 filed in the Korean Intellectual Property Office on Dec. 1, 2006, and No. 10-2007-0057886 filed in the Korean Intellectual Property Office on Jun. 13, 2007, the entire contents of which are incorporated herein by reference.

BACKGROUND OF THE INVENTION (a) Field of the Invention

The present invention relates to a method and apparatus for transmitting/receiving multiple codewords in an SC-FDMA (single carrier frequency division multiple access) system. More particularly, the present invention relates to a method and apparatus for transmitting/receiving data using multiple codewords in a communication system using SC-FDMA.

This work was supported by the IT R&D program of MIC/IITA [2006-S-001-01, Development of Adaptive Radio Access and Transmission Technologies for $4^{th}$ Generation Mobile Communications].

(b) Description of the Related Art

An OFDMA (orthogonal frequency division multiple access) system divides subcarriers for multiple users, and is suitable to transmit/receive data at a high speed through wire and wireless radio channels. Since the OFDMA system uses a plurality of carriers having orthogonality therebetween, efficiency in the usage of frequency is improved, and processes of modulating/detecting a plurality of carriers in a transmitter and a receiver obtain the same results as IDFT (inverse discrete Fourier transform) and DFT (discrete Fourier transform) are performed on the carriers. Therefore, the OFDMA system can perform the modulating/detecting processes at a high speed using IFFT (inverse fast Fourier transform) and FFT (fast Fourier transform).

Since the OFDMA system is suitable for high-speed data transmission and reception, it has been adopted as a standard scheme of an IEEE 802.11a standard, a high-speed wireless LAN (local area network) of a HIPERLAN/2 system, a broadband wireless access (BWA) system of an IEEE 802.16 standard, a digital audio broadcasting (DAB) system, a digital terrestrial television broadcasting (DTTB) system, an ADSL (asymmetric digital subscriber line), or a VDSL (very high data-rate digital subscriber line).

However, the OFDMA system has a problem in that a PAPR (peak to average power ratio) is high. In order to solve this problem, an SC-FDMA (single carrier frequency division multiple access) system that extends an SC-FDE (single carrier with frequency domain equalization) system to a subcarrier division system has been proposed.

In order to obtain a single carrier characteristic while maintaining frequency orthogonality, the SC-FDMA system is constructed by adding a DFT-spreading structure to the existing OFDMA system.

The SC-FDMA system enables multiple access using frequency domain orthogonality, which is an advantage of the existing OFDMA system, and can reduce a PAPR, which has not been achieved by the existing OFDMA system. However, the SC-FDMA has a problem in that interference between transmission symbols occurs in a frequency selective fading environment, resulting in low performance.

As described above, since the SC-FDMA system transmits or receives only one stream, there is a limitation in removing the interference between the symbols. As a result, the performance of the SC-FDMA system is lowered due to the interference between the symbols in the frequency selective fading environment.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for transmitting/receiving data using multiple codewords in a communication system using SC-FDMA.

Further, the invention has been made in an effort to minimize a PAPR in a communication system using SC-FDMA and to considerably reduce interference between symbols in a frequency selective fading environment.

An embodiment of the present invention proposes a method of transmitting/receiving data using multiple codewords in a communication system using SC-FDMA and the structure of a transceiver for transmitting/receiving data using multiple codewords in a communication system using SC-FDMA.

According to an exemplary embodiment of the present invention, there is provided a method of transmitting multiple codewords in an SC-FDMA (single carrier frequency division multiple access) system. The method includes dividing a user data stream into a plurality of sub-streams, independently performing channel coding and QAM (quadrature amplitude modulation) mapping on each of the sub-streams, mapping a signal subjected to the QAM mapping to a DFT (discrete Fourier transform) index, and performing DFT on the signal mapped to the DFT index and transmitting the multiple codewords.

In the transmitting method, the transmitting of the multiple codewords may include performing DFT on the signal mapped to the DFT index, mapping a signal obtained by the DFT to a subcarrier corresponding to the user, and performing IFFT (inverse fast Fourier transform) on the signal mapped to the subcarrier and transmitting the multiple codewords.

The transmitting method may further include receiving channel state information for each of the sub-streams from a receiver, and determining a code rate and a modulation method of each of the sub-streams and performing the channel coding and the QAM mapping on the basis of the result of the determination. The transmitting method may further include calculating an SINR (signal to interference and noise ratio) of each of the sub-streams using information that is fed back from a receiver, and determining a data transfer rate on the basis of the calculated SINR and transmitting the multiple codewords. The transmitting method may further include performing the channel coding and the QAM mapping on the basis of a data transfer rate that is fed back from a receiver, and determining the transmission power of each of the sub-streams on the basis of the transmission power of a first sub-stream and the transmission power offset between the sub-streams that are fed back from the receiver.

According to another exemplary embodiment of the present invention, there is provided a method of receiving multiple codewords in an SC-FDMA (single carrier frequency division multiple access) system. The method includes receiving the multiple codewords and performing FFT fast Fourier transform) on the received multiple codewords, performing a subcarrier demapping process on signals obtained by the FFT to extract signals corresponding to each user, and detecting and decoding the user signals to estimate signals corresponding to the users.

In the receiving method, the estimating of the signal may include: detecting one sub-stream of each received user signal; performing decoding using a plurality of detected output signals forming the sub-stream; determining a transmission signal for the sub-stream on the basis of the decoded signal; multiplying the transmission signal by a channel value to generate a received signal for the sub-stream; subtracting the received signal for the sub-stream from the received user signal to generate a modified user reception signal; and repeatedly performing the procedure from the detecting of the sub-stream to the generating of the modified user reception signal on the other sub-streams. In the receiving method, the estimating of the signal may include checking whether a CR (cyclic redundancy) value of the decoded signal is correct, and when the CR value is correct, performing the determining of the transmission signal.

The receiving method may further include calculating a post-detection SINR (signal to interference and noise ratio) of each sub-stream in consideration of SIC (successive interference cancellation) after the channels of all of the sub-streams are estimated, and feeding back the calculated SINR to a transmitter.

According to still another exemplary embodiment of the present invention, there is provided an apparatus for transmitting multiple codewords in an SC-FDMA (single carrier frequency division multiple access) system. The apparatus includes: a demultiplexer that demultiplexes a user data stream into a plurality of sub-streams; a plurality of encoders that independently perform channel coding on the sub-streams; a plurality of QAM (quadrature amplitude modulation) mappers that independently perform QAM mapping on the signals subjected to the channel coding; a DFT mapper that maps the signals subjected to the QAM mapping to DFT (discrete Fourier transform) indexes; a DFT (discrete Fourier transformer) that performs DFT on the signals mapped to the DFT indexes; a subcarrier mapper that maps a signal obtained by the DFT to a subcarrier corresponding to a user; and an IFFT (inverse fast Fourier transformer) that performs IFFT (inverse fast Fourier transform) on the signal mapped to the subcarrier and transmits the multiple codewords.

The transmitting apparatus may further include a rate controller that receives channel state information for each of the sub-streams from a receiver, determines a code rate and a modulation method of each of the sub-streams, and applies the determined code rate and modulation method to each encoder and each QAM mapper.

According to yet another exemplary embodiment of the present invention, there is provided an apparatus for receiving multiple codewords in an SC-FDMA (single carrier frequency division multiple access) system. The apparatus includes an FFT (fast Fourier transformer) that receives the multiple codewords and performs FFT (fast Fourier transform) thereon, a subcarrier demapper that performs a subcarrier demapping process on signals output from the FFT to extract signals corresponding to each user, and a plurality of detectors and decoders that detect and decode the user signals to estimate the signals corresponding to each user.

The receiving apparatus may further include a signal regenerator that generates a transmission signal for each sub-stream using the decoded signal, and an SIC (successive interference cancellation) device that multiplies the transmission signal by a channel value to generate a received signal for the sub-stream, and subtracts the received signal for the sub-stream from the received user signal to generate a modified user reception signal. The receiving apparatus may further include a CRC (cyclic redundancy check) device that checks whether a CR (cyclic redundancy) value of the decoded signal is correct, and when the CR value is correct, notifies the signal regenerator of the fact. The receiving apparatus may further include a channel state information generator that calculates a channel state information value for the sub-stream and feeds back the calculated value to a transmitter.

BRIEF DESCRIPTION OF THE DRAWINGS

FIG. 5 is a diagram illustrating an example of a mapping method performed by a DFT mapper according to an exemplary embodiment of the present invention when M=L/2.

FIG. 6 a diagram illustrating another example of the mapping method performed by the DFT mapper according to the exemplary embodiment of the present invention when M=L/2.

DETAILED DESCRIPTION OF THE EMBODIMENTS

Figure 1:
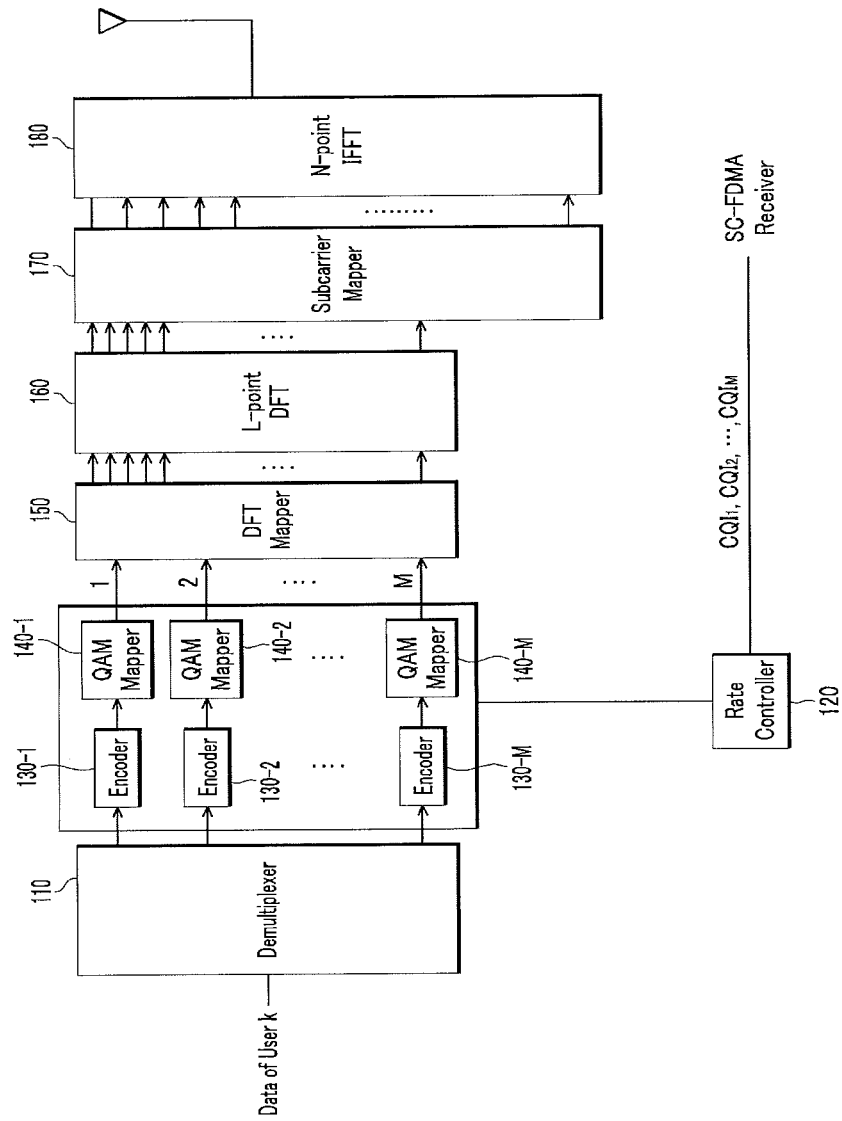
FIG. 1 is a block diagram illustrating a transmitter for transmitting multiple codewords in an SC-FDMA (single carrier frequency division multiple access) system according to an exemplary embodiment of the present invention.

Hereinafter, exemplary embodiments of the present invention will be described with reference to the accompanying drawings such that those skilled in the art can easily realize the invention. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

Hereinafter, a method and apparatus for transmitting/receiving multiple codewords in an SC-FDMA system (i.e., a communication system using SC-FDMA) according to an exemplary embodiment of the present invention will be described in detail with reference to the accompanying drawings.

Figure 7:
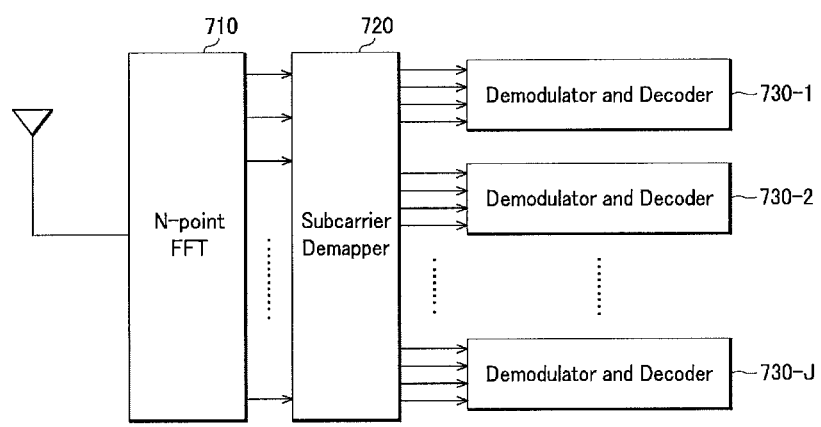
FIG. 7 is a block diagram schematically illustrating the structure of a receiver for receiving multiple codewords in an SC-FDMA system according to an exemplary embodiment of the present invention.

An apparatus for transmitting/receiving multiple codewords in an SC-FDMA system according to an exemplary embodiment of the present invention includes a transmitter that generates multiple codewords for user data and transmits the generated multiple codewords in the SC-FDMA system and a receiver that receives the multiple codewords from the transmitting apparatus and sequentially performs decoding and a successive interference cancellation (SIC) process on the received multiple codewords. FIG. 1 shows the overall structure of the transmitter, and FIG. 7 shows the overall structure of the receiver.

The transmitter divides user data into M sub-streams, independently performs channel coding and QAM (quadrature amplitude modulation) mapping on each of the sub-streams, maps each signal that has been subjected to QAM mapping to a DFT index, performs DFT on each signal that is mapped to the DFT index, and transmits multiple codewords.

The receiver receives the multiple codewords from the transmitter, sequentially performs detecting and decoding on each of the sub-streams, generates a reception signal for the decoded sub-stream, and subtracts the reception signal for the decoded sub-stream from the received multiple codewords.

In the apparatus for transmitting and receiving the multiple codewords in the SC-FDMA system according to the exemplary embodiment of the present invention, the transmitter divides one user signal into several sub-streams and simultaneously transmits several sub-streams, and the receiver performs the successive interference cancellation process using the decoded sub-streams. As a result, it is possible to effectively remove interference between symbols, as compared to a method of transmitting one sub-stream. That is, the apparatus for transmitting/receiving the multiple codewords in the SC-FDMA system according to the exemplary embodiment of the invention can considerably reduce interference between symbols in a frequency selective fading environment, while minimizing a PAPR.

FIG. 1 is a block diagram illustrating the structure of a transmitter to which multiple codewords is applied in a communication system using SC-FDMA according to the exemplary embodiment of the present invention. Particularly, FIG. 1 shows the structure of a transmitter for transmitting multiple codewords for data input from an arbitrary user k in the SC-FDMA system.

As shown in FIG. 1, a transmitter of a communication system using SC-FDMA (hereinafter referred to as an "SC-FDMA transmitter") according to an exemplary embodiment of the present invention includes a demultiplexer 110, a plurality of encoders 130-1 to 130-M, a plurality of QAM mappers 140-1 to 140-M, a DFT mapper 150, an L-point DFT 160, a subcarrier mapper 170, and an N-point IFFT 180. Alternatively, the SC-FDMA transmitter according to an exemplary embodiment of the present invention may further include a rate controller 120.

The demultiplexer 110 demultiplexes data input from the user k into M sub-streams, and inputs the sub-streams to the corresponding encoders 130-1 to 130-M.

The rate controller 120 determines a data transfer rate of each sub-stream using information (i.e., channel state information $CQI_1$ to $CQI_M$) that is fed back from a receiver of the communication system using SC-FDMA according to the exemplary embodiment of the present invention (hereinafter referred to as an "SC-FDMA receiver"). The rate controller 120 determines a code rate and a modulation method for each sub-stream using the channel state information items $CQI_1$ to $CQI_M$ for the M sub-streams that are fed back from the SC-FDMA receiver. Then, the rate controller 120 inputs the determined code rates to the corresponding encoders 130-1 to 130-M, and inputs the determined modulation methods to the corresponding QAM mappers 140-1 to 140-M. Alternatively, the rate controller 120 calculates an SINR (signal to interference and noise ratio) for each sub-stream using the information that is fed back from the SC-FDMA receiver, and determines the data transfer rate on the basis of the calculated SINR for each sub-stream. Alternatively, the rate controller 120 controls the encoders 130-1 to 130-M and the QAM mappers 140-1 to 140-M to perform channel coding and QAM symbol mapping on the sub-streams on the basis of the data transfer rate (or SINR) that is fed back from the SC-FDMA receiver, and determines transmission power for each sub-stream on the basis of the transmission power $P_1$ of the first sub-stream that is fed back from the SC-FDMA receiver and a transmission power offset $\Omega$.

The encoders 130-1 to 130-M independently perform channel coding on the sub-streams input from the demultiplexer 110. Alternatively, the encoders 130-1 to 130-M receive the code rates from the rate controller 120, perform channel coding on the corresponding sub-streams input from the demultiplexer 110 on the basis of the received code rates, and input the sub-streams of which channels are coded to the QAM mappers 140-1 to 140-M, respectively.

The QAM mappers 140-1 to 140-M independently perform QAM mapping on the sub-streams input from the encoders 130-1 to 130-M. Alternatively, the QAM mappers 140-1 to 140-M receive the modulation methods determined by the rate controller 120, uses the received modulation methods to perform QAM mapping on the sub-streams input from the encoders 130-1 to 130-M, and input sub-stream Nos. 1 to M that are subjected to QAM mapping to the DFT mapper 150, respectively.

The DFT mapper 150 receives the M sub-streams (1 to M) that have been subjected to QAM mapping from the QAM mappers 140-1 and 140-M, maps the received M sub-streams (1 to M) to DFT indexes, and inputs the mapped DFT indexes to the L-point DFT 160. At that time, the DFT mapper 150 allocates fixed DFT indexes to the M sub-streams (1 to M) input from the QAM mappers 140-1 to 140-M. Alternatively, the DFT mapper 150 changes the DFT indexes allocated to the M sub-streams (1 to M) that are respectively input from the QAM mappers 140-1 to 140-M with time to allocate all the DFT indexes at the same (or similar) ratio.

The L-point DFT 160 receives the DFT indexes mapped by the DFT mapper 150, performs L-point DFT on the received DFT indexes, and inputs the signals obtained by the L-point DFT to the subcarrier mapper 170.

The subcarrier mapper 170 receives the signals obtained by the L-point DFT from the L-point DFT 160, maps the received signals to subcarriers corresponding to the user k, and inputs the mapped subcarriers to the N-point IFFT 180.

The N-point IFFT 180 receives the mapped subcarriers from the subcarrier mapper 170, performs N-point IFFT on the received subcarriers, and transmits the signals obtained by the N-point IFFT through a transmitting antenna.

Figure 2:
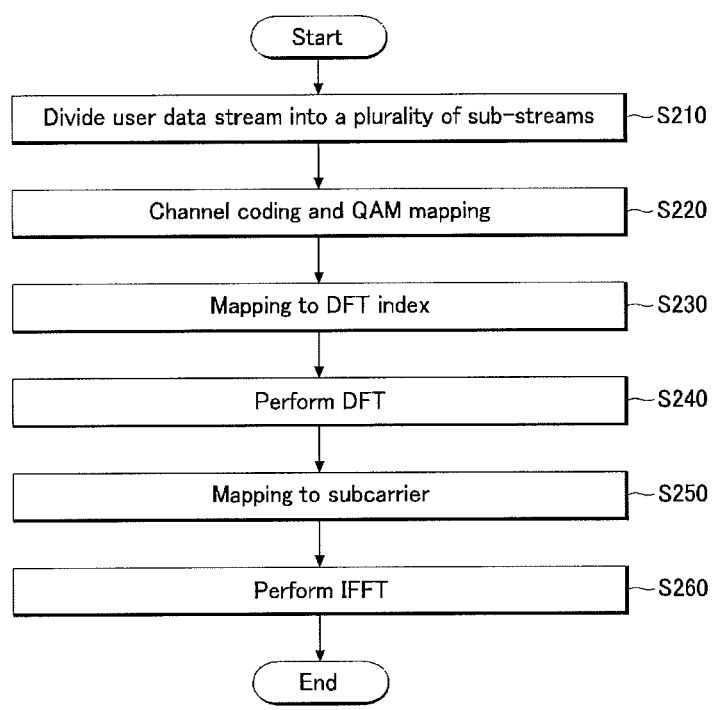
FIG. 2 is a flowchart illustrating a method of transmitting multiple codewords in an SC-FDMA system according to an exemplary embodiment of the present invention.
Figure 3:
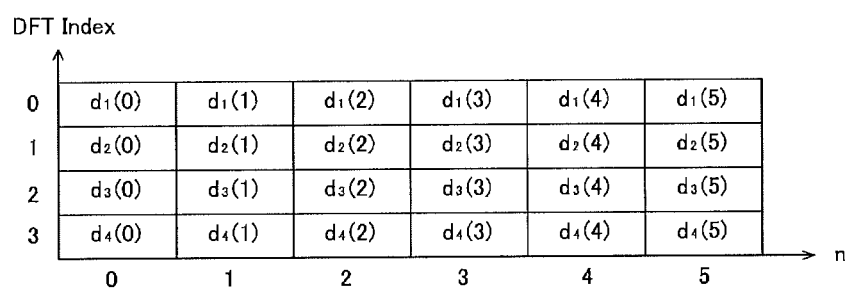
FIG. 3 is a diagram illustrating an example of a mapping method performed by a DFT (discrete Fourier transform) mapper according to an exemplary embodiment of the present invention when M=L.
Figure 4:
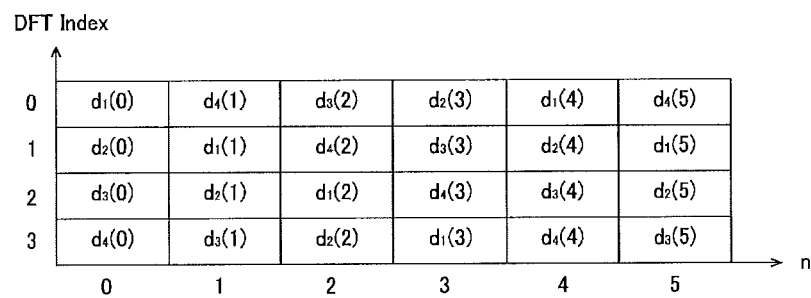
FIG. 4 is a diagram illustrating another example of the mapping method performed by the DFT mapper according to the exemplary embodiment of the present invention when M=L.

Next, a transmitting method using multiple codewords in a communication system using SC-FDMA according to an exemplary embodiment of the present invention will be described in detail with reference to FIGS. 2 to 6. FIG. 2 is a flowchart illustrating the transmitting method using multiple codewords in a communication system using SC-FDMA according to the exemplary embodiment of the present invention. FIG. 3 is a diagram illustrating an example of a mapping method when M=L in the DFT mapper according to an exemplary embodiment of the present invention. FIG. 4 is a diagram illustrating another example of the mapping method when M=L in the DFT mapper according to the exemplary embodiment of the present invention. FIG. 5 is a diagram illustrating an example of a mapping method when M=L/2 in the DFT mapper according to the exemplary embodiment of the present invention. FIG. 6 is a diagram illustrating another example of the mapping method when M=L/2 in the DFT mapper according to the exemplary embodiment of the present invention.

In the SC-FDMA transmitter of the communication system, the demultiplexer 110 demultiplexes a data stream for the user k into M sub-streams (step S210). In this case, the demultiplexer 110 demultiplexes data for the user k into M sub-streams, and inputs the sub-streams to the corresponding encoders 130-1 to 130-M.

The M encoders 130-1 to 130-M and the M QAM mappers 140-1 to 140-M independently perform channel coding and QAM mapping on the M sub-streams, respectively (step S220). In this case, the code rates and the modulation methods for the M sub-streams are determined on the basis of the channel state information items $CQI_1$ to $CQI_M$ for the M sub-streams that are fed back from the SC-FDMA receiver.

That is, the rate controller 120 determines the code rates and the modulation methods for the M sub-streams on the basis of the channel state information items $CQI_1$ to $CQI_M$ for the M sub-streams that are fed back from the SC-FDMA receiver. Then, the rate controller 120 inputs the determined code rates to the encoders 130-1 to 130-M, and inputs the determined modulation methods to the QAM mappers 140-1 to 140-M.

Then, the encoders 130-1 to 130-M perform channel coding on the sub-streams input from the demultiplexer 110 according to the code rates input from the rate controller 120, and inputs the sub-streams of which channels are coded to the QAM mappers 140-1 to 140-M. The QAM mappers 140-1 to 140-M use the modulation methods input from the rate controller 120 to perform QAM mapping on the sub-streams input from the encoders 130-1 to 130-M, respectively, and input the M sub-streams (1 to M) that have been subjected to QAM mapping to the DFT mapper 150.

Then, the DFT mapper 150 maps the M sub-streams (1 to M) that have been subjected to QAM mapping in the QAM mappers 140-1 to 140-M to DFT indexes (step S230). That is, the DFT mapper 150 receives the M sub-streams (1 to M) that have been subjected to QAM mapping from the QAM mappers 140-1 to 140-M, maps the received M sub-streams (1 to M) to the DFT indexes, and inputs the mapped DFT indexes to the L-point DFT 160. In step S230 in which the signals that have been subjected to QAM mapping are mapped to the DFT indexes, fixed DFT indexes are allocated to the M sub-streams (1 to M) at all times. Alternatively, in step S230 in which the signals that have been subjected to QAM mapping are mapped to the DFT indexes, the DFT indexes allocated to the M sub-streams (1 to M) are changed with time such that all of the DFT indexes are allocated at the same (or similar) ratio.

Then, the DFT mapper 150 performs DFT on the signals mapped to the DFT indexes (step S240). The L-point DFT 160 receives the mapped DFT indexes from the DFT mapper 150, performs L-point DFT on the received DFT indexes, and inputs the signals obtained by the L-point DFT to the subcarrier mapper 170.

The subcarrier mapper 170 maps the signals subjected to DFT to the subcarriers corresponding to the user k (step S250). In this case, the subcarrier mapper 170 receives the signals obtained by the L-point DFT, maps the received signals to the subcarriers corresponding to the user k, and inputs the mapped subcarriers to the N-point IFFT 180.

The subcarrier mapper 170 performs IFFT on the mapped subcarriers, and transmits the transformed signals through the transmitting antenna (step S260). The N-point IFFT 180 receives the subcarriers mapped by the subcarrier mapper 170, performs N-point IFFT on the received subcarriers, and transmits the signals obtained by the N-point IFFT through the transmitting antenna.

Next, the mapping method in the DFT mapper 150 in step S230 will be described.

First, the QAM mapper 140-M performs QAM mapping on an m-th sub-stream of data for the user k to obtain a signal $d_k^{(m)}$ that is defined by Equation 1 given below. In this case, it is assumed that one sub-stream is composed of Q QAM signals.

$$d_k^{(m)} = [d_k^{(m)}(0), d_k^{(m)}(1), \ldots, d_k^{(m)}(Q-1)], m=1,2,\ldots,M \quad \text{(Equation 1)}$$

Therefore, an output signal $s_k(n)$ of the DFT mapper 150 at an L-point for an n-th transmission time is defined by Equation 2 given below:

$$s_k(n) = [s_{k,0}(n), s_{k,1}(n), \ldots, s_{k,L-1}(n)]. \quad \text{(Equation 2)}$$

Various methods can be used to map $d_k^{(m)}$, m=1, 2, ... M to $s_k(n)$. For example, the following mapping method can be used. When M=L, $d_k^{(l)}(n)$ is mapped to one of the L elements forming $s_k(n)$. When M=L/P (where P is a positive integer), P elements among Q elements forming $d_k^{(m)}$ are mapped to P elements among L elements forming $s_k(n)$.

FIGS. 3 and 4 are diagrams illustrating examples of the mapping method performed by the DFT mapper 150 when M=L, L=4, and Q=6. FIG. 3 shows an example of the mapping of one sub-stream to one DFT index, and FIG. 4 shows an example of the mapping of one sub-stream to another DFT index with time. FIGS. 5 and 6 are diagrams illustrating examples of the mapping method performed by the DFT mapper 150 when M=L/2, L=4, and Q=6. In this exemplary embodiment of the present invention, the mapping methods shown in FIGS. 3, 4, 5, and 6 are described, but the present invention is not limited thereto. Various mapping methods other than the mapping methods shown in FIGS. 3, 4, 5, and 6 may be used.

The L-point DFT 160 performs L-point DFT on the output signal $s_k(n)$ of the DFT mapper 150, and outputs a signal $x_k(n)$ that is defined by Equation 3 given below:

$$x_k(n) = V s_k(n), n = 0, 1, \ldots, \frac{QM}{L} - 1. \quad \text{(Equation 3)}$$

In Equation 3, "V=[$v_1$ $v_2$ ... $v_L$]" is a DFT matrix, and an element $[V]_{l,m}$, which is in an l-th row and an m-th column, is defined by Equation 4 given below:

$$[V]_{l,m} \frac{1}{\sqrt{2\pi L}} e^{-j2\pi lm/L}. \quad \text{(Equation 4)}$$

Next, the SC-FDMA receiver for a communication system using SC-FDMA according to an exemplary embodiment of the present invention will be described in detail with reference to FIGS. 7 and 8.

FIG. 7 is a diagram illustrating the structure of the SC-FDMA receiver according to the exemplary embodiment of the present invention. The SC-FDMA receiver according to the exemplary embodiment of the present invention performs N-point FFT on a received signal, performs the demapping of a subcarrier to separate user signals, and detects and decodes the separated user signals to estimate each of the user signals.

As shown in FIG. 7, the SC-FDMA receiver according to the exemplary embodiment of the present invention includes an N-point FFT 710, a subcarrier demapper 720, and a plurality of detectors and decoders 730-1 to 730-J. The N-point FFT 710 receives signals through a receiving antenna, performs N-point FFT on the received signals, and inputs the signals subjected to the N-point FFT to the subcarrier demapper 720. The subcarrier demapper 720 performs a subcarrier demapping process on the signals input from the N-point FFT 710 to separate user signals, and inputs the separated user signals to the corresponding detectors and decoders 730-1 to 730-J. The detectors and decoders 730-1 to 730-J detect and decode the user signals input from the subcarrier demapper 720 to estimate the user signals.

Figure 8:
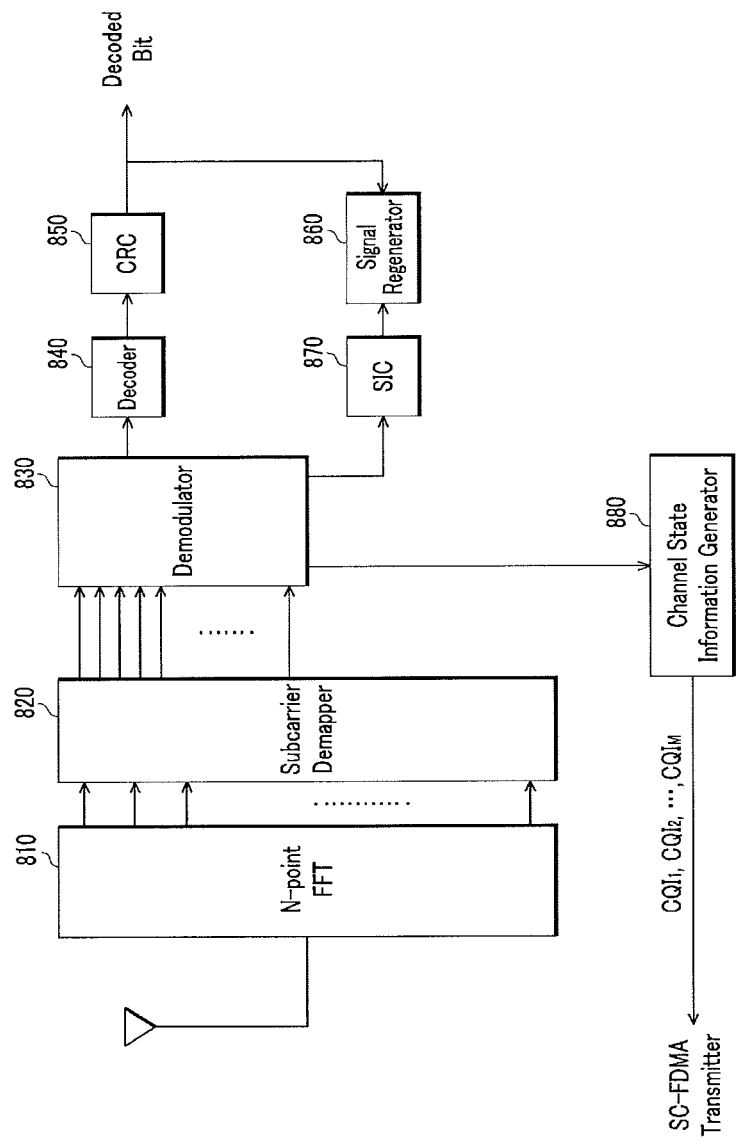
FIG. 8 is a block diagram illustrating the structure of a receiver for receiving multiple codewords for a user k in an SC-FDMA system according to another exemplary embodiment of the present invention.

FIG. 8 is a diagram illustrating the structure of an SC-FDMA receiver for a user k according to another exemplary embodiment of the present invention. Particularly, FIG. 8 is a detailed diagram illustrating a structure for detecting and decoding signals for an arbitrary user k.

As shown in FIG. 8, the SC-FDMA receiver for the user k according to another exemplary embodiment of the present invention includes an N-point FFT 810, a subcarrier demapper 820, a detector 830, a decoder 840, a CRC (cyclic redundancy checker) 850, a signal regenerator 860, and an SIC 870. Alternatively, the SC-FDMA receiver for the user k according to another exemplary embodiment of the present invention may further include a channel state information generator 880. The N-point FFT 810 and the subcarrier demapper 820 have the same structures as the N-point FFT 710 and the subcarrier demapper 720 shown in FIG. 7, and thus a detailed description thereof will be omitted.

The detector 830 performs a channel estimating process on the user signals input from the subcarrier demapper 820, detects the user signals, and inputs Q detected output signals forming one sub-stream to the decoder 840.

The decoder 840 decodes the Q detected output signals input from the detector 830, and inputs the decoded bits to the CRC 850.

The CRC 850 receives the decoded bits from the decoder 840, and checks the CR (cyclic redundancy) values thereof. When the checked CR value is correct, the CRC 850 considers that signals for one sub-stream are correctly decoded, and notifies the signal regenerator 860 of the fact. On the other hand, when the checked CR value is incorrect, the CRC 850 determines that the signals for one sub-stream are incorrectly decoded, and transmits a retransmission request signal to the SC-FDMA transmitter.

The signal regenerator 860 receives the notification from the CRC 850, regenerates the original transmission signal for one sub-stream, and inputs the regenerated signal to the SIC 870.

The SIC 870 multiplies the transmission signal input from the signal regenerator 860 by a channel value to generate a reception signal for one sub-stream, subtracts a received sub-stream signal from a user reception signal to obtain a modulated user reception signal, and inputs the modulated user reception signal to the detector 830 again to detect other sub-stream signals.

The channel state information generator 880 calculates channel state information values for M sub-streams and feeds back the channel state information values to the SC-FDMA transmitter. In this case, the channel state information values for the M sub-streams of the user k are obtained by calculating the SINR values of the signals detected by the detector 830, considering sequential interference cancellation. Alternatively, the channel state information generator 880 calculates the transmission power $P_1$, transmission power offset $\Omega$, and data transfer rate R of a first sub-stream, and feeds back the calculated transmission power $P_1$, transmission power offset $\Omega$, and data transfer rate R of the first sub-stream to the SC-FDMA transmitter.

Figure 9:
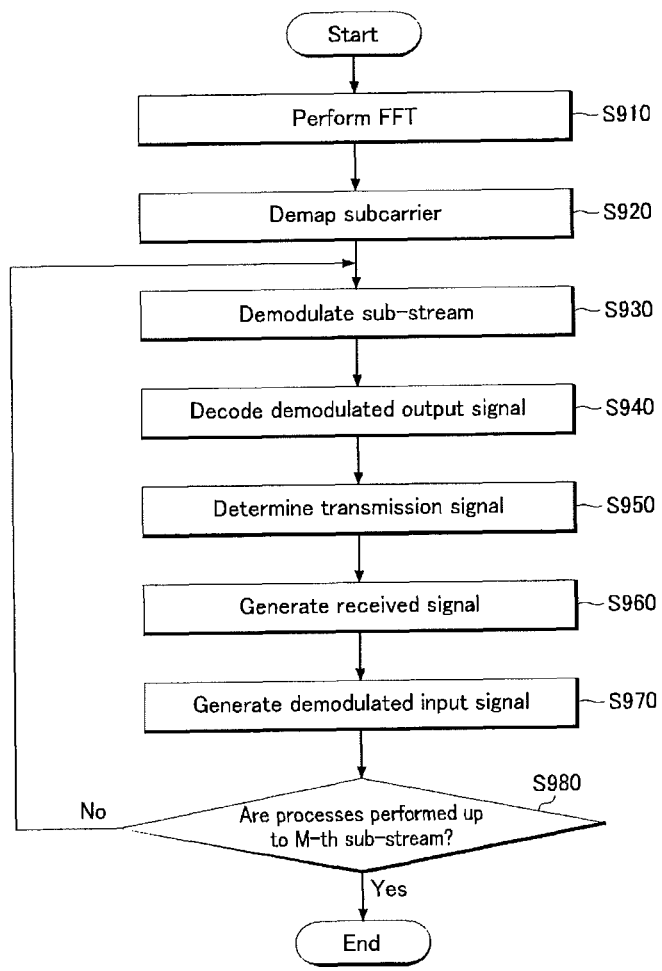
FIG. 9 is a flowchart illustrating a method of receiving multiple codewords in an SC-FDMA system according to an exemplary embodiment of the present invention.

Next, a receiving method using multiple codewords in a communication system using SC-FDMA according to an exemplary embodiment of the present invention will be described in detail with reference to a flowchart shown in FIG. 9.

The SC-FDMA receiver in the communication system using SC-FDMA performs FFT on a received signal (step S910). In this case, the N-point FFT 810 performs N-point FFT on the signal received through the receiving antenna, and inputs the signals subjected to the N-point FFT to the subcarrier demapper 720.

Then, the subcarrier demapper 820 performs a subcarrier demapping process on the signals output from the N-point FFT 810 to extract user signals (step S920). Specifically, the subcarrier demapper 820 performs the subcarrier demapping process on the signals input from the N-point FFT 810 to separate the user signals, and inputs the separated user signals to the detector 830.

Then, the detector 830 detects the user signals for one sub-stream separated by the subcarrier demapper 820 (step S930). Specifically, the detector 830 detects the user signals input from the subcarrier demapper 820, and inputs Q detected output signals forming one sub-stream to the decoder 840.

Subsequently, decoding is performed using the Q detected output signals forming one sub-stream (step S940). Specifically, the decoder 840 decodes the Q detected output signals input from the detector 830, and inputs the decoded signals to the CRC 850.

Steps S930 and S940 in which signals for an arbitrary user k are detected and decoded will be described in more detail below.

In order to estimate signals for the user k, the detector 830 extracts only the signals for the user k that are input from the subcarrier demapper 820. When the extracted signal for the user k is "$r_k(n)$", the extracted signal $r_k(n)$ can be represented by Equation 5 given below:

$$r_k(n) = H_k V s_k(n) + w_k(n) \quad \text{(Equation 5)}$$

where "$H_k = \text{diag}(H_{k,0}, H_{k,1}, \ldots, H_{k,L-1})$" indicates a frequency domain channel characteristic for the user k, and "$w_k(n)$" indicates an AWGN (additive white Gaussian noise) signal having an average of "0" and a variance of "$\sigma_w^2$".

The detector 830, the decoder 840, and the SIC 850 are used to separate M sub-streams from the extracted signal $r_k(n)$. It is assumed that decoding is sequentially performed on the M sub-streams in the order of sub-streams 1, 2, ..., M, for convenience of explanation. However, the present invention is not limited thereto.

First, the detector 830 is used to decode the first sub-stream separated from the extract signal $r_k(n)$. In this exemplary embodiment of the present invention, any type of detector may be used, but an MMSE (minimum mean square error) detector is used in this exemplary embodiment of the present invention for convenience of explanation.

The MMSE detector for finding out an element $s_{k,l}(n)$, which is an l-th element of $s_k(n)$, from the extracted signal $r_k(n)$ can be represented by Equation 6 given below:
where "$v_l$" indicates an l-th column vector of a DFT matrix (v), $$f_k^{(1)} = (H_k H_k^H + \sigma_w^2 I_L)^{-1} H_k v_l.$$  (Equation 6)

When M=L and DFT mapping is performed as shown in FIG. 3, $f_k^{(1)}$ is used to detect the first sub-stream. When DFT mapping is performed as shown in FIG. 5A, $f_k^{(1)}$ and $f_k^{(2)}$ are used to detect the first sub-stream. When DFT mapping is performed as shown in FIG. 5B, $f_k^{(1)}$ and $f_k^{(3)}$ are used to detect the first sub-stream. In the SC-FDMA transmitter, the MMSE detector corresponding to the first sub-stream is used to perform DFT mapping on the first sub-stream, and the Q detected output signals forming the first sub-stream are decoded.

The decoder 840 determines a transmission signal for the sub-stream using the decoded signal (step S950). The CRC 850 checks the CR value of the signal decoded by the decoder 840. When the CR value is correct, the CRC 850 considers that the signal for the first sub-stream is correctly decoded, and notifies the signal regenerator 860 of the fact. On the other hand, when the CR value is incorrect as the check result, the CRC 850 considers that the signal for the first sub-stream is incorrectly decoded, and transmits a retransmission request signal to the SC-FDMA transmitter.

When the signal for the first sub-stream is correctly decoded, the signal regenerator 860 regenerates the original transmission signal for the first sub-stream and inputs the regenerated signal to the SIC 870.

The SIC 870 multiplies the transmission signal generated by the signal regenerator 860 by a channel value to obtain a reception signal for the sub-stream (step S960). Specifically, the SIC 870 multiplies the transmission signal input from the signal regenerator 860 by a channel value to generate a reception signal for the first sub-stream, and subtracts the reception signal generated by the signal regenerator 860 from a detected input signal $r_k(n)$ to generate a modulated detection input signal $r_k^{(1)}(n)$ (step S970). That is, the SIC 870 subtracts the reception signal input from the signal regenerator 860 from the extracted signal $r_k(n)$ to generate a modulated signal $r_k^{(1)}(n)$, and inputs the modulated signal $r_k^{(1)}(n)$ to the detector 830 again.

Then, the same method as that used for the first sub-stream (i.e., the processes from step S930 to step S970) is performed on $r_k^{(1)}(n)$ to decode the second sub-stream. This method (i.e., processes from step S930 to step S970) is similarly performed on the sub-streams (3, 4, . . . , M) to decode the sub-streams, thereby estimating the sub-stream (2, 3, . . . , M).

That is, it is checked that the processes from step S930 to step S970 are repeated up to the M-th sub-stream (step S980). As the check result, when the processes are not performed up to the M-th sub-stream, the processes are repeated from step S930. The processes from step S930 to step S970 are repeatedly performed on the sub-streams (2, 3, . . . , M) to estimate the sub-streams (2, 3, . . . , M).

Another embodiment of the present invention provides a method of controlling the transfer rate and the transmission power of each sub-stream using feedback information output from the SC-FDMA receiver in the SC-FDMA transmitter, which makes it possible to improve a data transfer rate. In addition, according to this embodiment of the present invention, the SC-FDMA receiver feeds back a post-detection SINR for each sub-stream to the SC-FDMA transmitter, and the SC-FDMA transmitter independently performs channel coding and QAM mapping on each sub-stream, which makes it possible to improve an SIC gain and a data transfer rate by the channel state adaptive transmission.

Next, a method of feeding back channel state information items $CQI_1$ to $CQI_M$ for M sub-streams to the SC-FDMA transmitter will be described.

As described above, the SC-FDMA receiver estimates channels for M sub-streams, calculates a post-detection SINR for each sub-stream in consideration of SIC, and feeds back the calculated SINR for each sub-stream to the SC-FDMA transmitter.

That is, when the signal $r_k(n)$ for the user k is extracted from the subcarrier demapper 820 and the sub-streams (1, 2, . . . , M) are removed from the extracted signal to obtain a modulated signal, the modulated signal is defined as "$r_k^{(m)}(n)$" and it is defined that "$r_k(n) = r_k^{(0)}(n)$". The SINR value of the signal obtained by the detector 830 may be used as the channel state information value. When the detector 830 detects a modified signal $r_k^{(m-1)}(n)$ for the M-th sub-stream to obtain a signal, a channel state information value for the M-th sub-stream of the user k can be obtained by calculating the SINR value of the obtained signal. The SINR is a post-detection SINR in consideration of SIC. In this way, the channel state information values for M sub-streams are calculated, and the calculated values are fed back to the SC-FDMA transmitter.

Then, the SC-FDMA transmitter determines a data transfer rate for each sub-stream using the feedback information (i.e., channel state information) from the SC-FDMA receiver.

In the DFT mapping method, different DFT indexes are mapped to one sub-stream.

However, when DFT indexes are mapped to the corresponding sub-streams, the difference between the post-detection SINRs of adjacent sub-streams is substantially constant. That is, when the post-detection SINR of a j-th sub-stream is referred to as "$SINR_j$", the sub-streams (1, 2, . . . , M−1) satisfy Equation 7 given below:

$$SINR_{j+1} \approx SINR_j + \Delta.$$  (Equation 7)

Therefore, when the DFT indexes are mapped to the corresponding sub-streams, the SC-FDMA receiver may feed back an SINR offset $\Delta$ between the post-detection SINR of the j-th sub-stream (SINR) and the post-detection SINR of the first sub-stream.

That is, as described above, the SC-FDMA receiver estimates channels for M sub-streams, calculates the post-detection SINR of the first sub-stream ($SINR_1$), calculates the SINR offset $\Delta$ between the sub-streams, and feeds back the calculated post-detection SINR of the first sub-stream ($SINR_1$) and the calculated SINR offset $\Delta$ to the SC-FDMA transmitter.

In this case, the SC-FDMA transmitter calculates an SINR for each sub-stream using the information fed back from the SC-FDMA receiver, and the SINR of the j-th sub-stream is estimated by Equation 8 given below.

$$SINR_j \approx SINR_1 + (j-1)\Delta.$$  (Equation 8)

In Equation 8, "$SINR_1$" indicates the post-detection SINR of the j-th sub-stream in consideration of sequential interference cancellation, and the SC-FDMA transmitter determines a data transfer rate according to the calculated SINR for each sub-stream and transmits data at the determined data transfer rate.

In this embodiment, a channel feedback method when all of the sub-streams are transmitted with the same transmission power has been described. Next, the structure in which SC-FDMA transmitter transmits the sub-streams at the same data transfer rate but with different transmission powers will be described.

The SC-FDMA receiver feeds back two values to the SC-FDMA transmitter. One of the two values is a data transfer rate (or SINR) applied to all of the sub-streams, and the other value is the transmission power offset $\Omega$.

That is, as described above, the SC-FDMA receiver estimates channels for M sub-streams, calculates the transmission power $P_1$, transmission power offset $\Omega$, and data transfer rate R of the first sub-stream, and feeds back the calculated transmission power $P_1$, transmission power offset $\Omega$, and data transfer rate R of the first sub-stream to the SC-FDMA transmitter.

The SC-FDMA transmitter performs channel coding and QAM symbol mapping on each sub-stream using the data transfer rate (or SINR) from the SC-FDMA receiver, and calculates power required to transmit each sub-stream using the transmission power offset $\Omega$. The SC-FDMA transmitter performs channel coding and QAM mapping using the data transfer rate R that is fed back from the SC-FDMA receiver, and determines power required to transmit each sub-stream, on the basis of the transmission power $P_1$ and transmission power offset $\Omega$ of the first sub-stream that are fed back from the SC-FDMA receiver, by using Equation 9 given below:

$$P_j = P_1 - (j-1)\Omega, \quad \text{(Equation 9)}$$

where "$P_j$" indicates power required to transmit the j-th sub-stream.

In this way, when the sub-streams are transmitted by different powers, it is possible to considerably reduce the reception error rate.

The components described in the exemplary embodiments of the present invention may be achieved by hardware components including at least one DSP (digital signal processor), a processor, a controller, an ASIC (application specific integrated circuit), a programmable logic element such as an FPGA (field programmable gate array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the above-described exemplary embodiments of the present invention, it is possible to minimize PAPR in a communication system using SC-FDMA, and considerably reduce interference between symbols in a frequency selective fading environment.

What is claimed is:

1. A method of transmitting symbols in a transmitter, the method comprising:
    preparing a plurality of sub-streams including a first sub-stream and a second sub-stream;
    independently performing channel coding on each of the first and second sub-streams;
    mapping the channel coded sub-streams to modulation symbols, wherein different channel coded sub-streams are mapped to different modulation symbols;
    generating single carrier frequency division multiple access (SC-FDMA) symbols from the modulation symbols, one of the SC-FDMA symbols being generated by using at least part of the modulation symbols from the first sub-stream and part of the modulation symbols from the second sub-stream; and
    transmitting the SC-FDMA symbols to a receiver.

2. The method of claim 1, wherein generating the SC-FDMA symbols comprises:
    transforming the modulation symbols;
    mapping the transformed symbols to subcarriers; and
    generating the SC-FDMA symbols from the symbols mapped to the subcarriers.

3. The method of claim 1, wherein a transfer rate of the first sub-stream and a transfer rate of the second sub-stream are differently determined.

4. The method of claim 3, further comprising receiving an offset for determining the transfer rate of the first sub-stream and the transfer rate of the second sub-stream from the receiver.

5. The method of claim 1, further comprising receiving feedback information from the receiver; and
    determining transfer rates of the sub-streams based on the feedback information.

6. A method of receiving a signal in a receiver, the method comprising: receiving single carrier frequency division multiple access (SC-FDMA) symbols from a transmitter; and
    extracting a plurality of sub-streams including a first sub-stream and a second sub-stream from the SC-FDMA symbols,
    wherein the SC-FDMA symbols are generated, by the transmitter, by independently performing channel coding on each of the first and second sub-streams, mapping the channel coded sub-streams to modulation symbols, generating the SC-FDMA symbols from the modulation symbols,
    wherein different channel coded sub-streams are mapped to different modulation symbols, and wherein one of the SC-FDMA symbols are generated by using at least part of the modulation symbols from the first sub-stream and part of the modulation symbols from the second sub-stream.

7. The method of claim 6, wherein the modulation symbols are transformed, the transformed symbols are mapped to subcarriers, and the SC-FDMA symbols are generated from the symbols mapped to the subcarriers, by the transmitter.

8. The method of claim 6, wherein a transfer rate of the first sub-stream and a transfer rate of the second sub-stream are differently determined.

9. The method of claim 8, further comprising transmitting an offset for determining the transfer rate of the first sub-stream and the transfer rate of the second sub-stream.

10. The method of claim 6, further comprising transmitting feedback information for determining transfer rates of the sub-streams to the transmitter.

11. A transmitter comprising:
    a demultiplexer configured to prepare a plurality of sub-streams including a first sub-stream and a second sub-stream;
    a plurality of encoders configured to independently perform channel coding on each of the first and second sub-streams;
    a mapper configured to map the channel coded sub-streams to modulation symbols, wherein different channel coded sub-streams are mapped to different modulation symbols; and
    a generator configured to generate single carrier frequency division multiple access (SC-FDMA) symbols, to be transmitted to a receiver, from the modulation symbols, one of the SC-FDMA symbols being generated by using at least part of the modulation symbols from the first sub-stream and part of the modulation symbols from the second sub-stream.

12. The transmitter of claim 11, wherein the generator comprises:
a first transformer configured to transform the modulation symbols;
a subcarrier mapper configured to map the transformed symbols to subcarriers; and
a second transformer configured to generate the SC-FDMA symbols from the symbols mapped to the subcarriers.

13. The transmitter of claim 11, wherein a transfer rate of the first sub-stream and a transfer rate of the second sub-stream are differently determined.

14. The transmitter of claim 13, further comprising a rate controller configured to receive an offset for determining the transfer rate of the first sub-stream and the transfer rate of the second sub-stream from the receiver.

15. The transmitter of claim 11, further comprising a rate controller configured to receive feedback information from the receiver, and determine transfer rates of the sub-streams based on the feedback information.

16. A receiver comprising:
a receiver configured to receive single carrier frequency division multiple access (SC-FDMA) symbols from a transmitter; and
a decoder configured to extract a plurality of sub-streams including a first sub-stream and a second sub-stream from the SC-FDMA symbols,
wherein the SC-FDMA symbols are generated, by the transmitter, by independently performing channel coding on each of the first and second sub-streams, mapping the channel coded sub-streams to modulation symbols, generating the SC-FDMA symbols from the modulation symbols,
wherein different channel coded sub-streams are mapped to different modulation symbols, and
wherein one of the SC-FDMA symbols are generated by using at least part of the modulation symbols from the first sub-stream and part of the modulation symbols from the second sub-stream.

17. The receiver of claim 16, wherein the modulation symbols are transformed, the transformed symbols are mapped to subcarriers, and the SC-FDMA symbols are generated from the symbols mapped to the subcarriers, by the transmitter.

18. The receiver of claim 16, wherein a transfer rate of the first sub-stream and a transfer rate of the second sub-stream are differently determined.

19. The receiver of claim 18, further comprising an information generator configured to transmit an offset for determining the transfer rate of the first sub-stream and the transfer rate of the second sub-stream.

20. The receiver of claim 16, further comprising an information generator configured to transmit feedback information for determining transfer rates of the sub-streams to the transmitter.

* * * * *